(12) United States Patent
Fujita et al.

(10) Patent No.: US 9,586,831 B2
(45) Date of Patent: Mar. 7, 2017

(54) UREA TO AMMONIA PROCESS

(71) Applicant: Wahlco, Inc., Santa Ana, CA (US)

(72) Inventors: Madoka Fujita, Irvine, CA (US); William G. Hankins, Sammamish, WA (US); Peter Paul Anderson, Mission Viejo, CA (US)

(73) Assignee: Wahlco, Inc., Santa Ana, CA (US)

( * ) Notice: Subject to any disclaimer, the term of this patent is extended or adjusted under 35 U.S.C. 154(b) by 122 days.

(21) Appl. No.: 14/299,759

(22) Filed: Jun. 9, 2014

(65) Prior Publication Data

US 2015/0353370 A1    Dec. 10, 2015

(51) Int. Cl.
| | | |
|---|---|---|
| *B01D 53/56* | (2006.01) | |
| *C01C 1/08* | (2006.01) | |
| *B01J 12/00* | (2006.01) | |

(52) U.S. Cl.
CPC .............. *C01C 1/086* (2013.01); *B01D 53/56* (2013.01); *B01J 12/00* (2013.01); *B01J 2203/0655* (2013.01); *B01J 2219/00078* (2013.01); *B01J 2219/00081* (2013.01); *B01J 2219/00083* (2013.01); *B01J 2219/00085* (2013.01)

(58) Field of Classification Search
CPC ................................. C01B 3/025; C01C 1/086
USPC .................. 423/358, 359, 352; 422/202, 198
See application file for complete search history.

(56) References Cited

U.S. PATENT DOCUMENTS

| | | |
|---|---|---|
| 2,492,407 A | 12/1949 | Tomany |
| 3,826,815 A | 7/1974 | Mavrovic |
| 3,900,554 A | 8/1975 | Lyon |
| 3,922,222 A | 11/1975 | Van Moorsel |
| 4,087,513 A | 5/1978 | Schell |
| 4,168,299 A | 9/1979 | Schell |
| 4,220,632 A | 9/1980 | Pence et al. |
| 4,308,385 A | 12/1981 | Goorden |
| 4,327,068 A | 4/1982 | Lagana et al. |
| 4,341,640 A | 7/1982 | Landis |

(Continued)

FOREIGN PATENT DOCUMENTS

| | | |
|---|---|---|
| CN | 102759106 A | 10/2012 |
| DE | 23 62 887 A | 6/1975 |

(Continued)

OTHER PUBLICATIONS

Kopius-Odink, et al, "The First De-NOx Installation in the Netherlands, A Demonstration Project at EPON-Nijmegen Power Station", Proceedings of Session 6A of the Joint Symposium on Stationary Combustion NOx Control, United States Environmental Protection Agency and The Electric Power Research Institute, Mar. 6-9, 1989, San Francisco, California.

(Continued)

*Primary Examiner* — Wayne Langel (74) *Attorney, Agent, or Firm* — Joseph E. Mueth, Esq.

(57) ABSTRACT

Methods and systems for producing a pressurized ammonia-containing gas stream from aqueous urea. The method comprising pumping an aqueous urea-containing solution to a fluid-tight enclosure at a rate to match the external demand for ammonia-gas, wherein a fluid heat transfer medium is applied to the exterior of the fluid-tight enclosure to transfer heat to the aqueous urea-containing solution sufficient to hydrolyze the solution to an ammonia gaseous product. The systems comprise means for carrying out the methods.

30 Claims, 5 Drawing Sheets

(56) References Cited

U.S. PATENT DOCUMENTS

| | | | |
|---|---|---|---|
| 4,410,503 A | 10/1983 | Van Nassau et al. | |
| 4,533,364 A | 8/1985 | Altman et al. | |
| 4,552,979 A * | 11/1985 | Stokes | C07C 273/02 |
| | | | 423/359 |
| 4,652,678 A | 3/1987 | Douwes | |
| 4,719,092 A | 1/1988 | Bowers | |
| 4,751,065 A | 6/1988 | Bowers | |
| 4,851,201 A | 7/1989 | Heap et al. | |
| 4,906,447 A | 3/1990 | Schwarzenbek | |
| 4,927,612 A | 5/1990 | Bowers | |
| 5,034,030 A | 7/1991 | Miller et al. | |
| 5,047,220 A | 9/1991 | Polcer | |
| 5,058,514 A | 10/1991 | Mozes et al. | |
| 5,096,599 A | 3/1992 | Granelli | |
| 5,098,680 A | 3/1992 | Fellows et al. | |
| 5,116,584 A | 5/1992 | Chen et al. | |
| 5,118,481 A | 6/1992 | Lyon | |
| 5,165,903 A | 11/1992 | Hunt et al. | |
| 5,237,939 A | 8/1993 | Spokoyny et al. | |
| 5,240,688 A | 8/1993 | Von Harpe et al. | |
| 5,252,308 A | 10/1993 | Young | |
| 5,270,025 A | 12/1993 | Ho et al. | |
| 5,281,403 A | 1/1994 | Jones | |
| 5,399,325 A | 3/1995 | Von Harpe et al. | |
| 5,478,542 A | 12/1995 | Chawla et al. | |
| 5,543,123 A | 8/1996 | Hofmann et al. | |
| 5,567,226 A | 10/1996 | Lookman et al. | |
| 5,809,774 A | 9/1998 | Peter-Hoblyn et al. | |
| 5,827,490 A | 10/1998 | Jones | |
| 5,943,865 A | 8/1999 | Cohen | |
| 5,976,475 A | 11/1999 | Peter-Hoblyn et al. | |
| 5,985,224 A | 11/1999 | Lagana | |
| 6,017,503 A | 1/2000 | Kato et al. | |
| 6,048,510 A | 4/2000 | Zauderer | |
| 6,051,040 A | 4/2000 | Peter-Hoblyn | |
| 6,077,491 A * | 6/2000 | Cooper | B01D 53/56 |
| | | | 423/235 |
| 6,093,380 A | 7/2000 | Lagana et al. | |
| 6,322,762 B1 | 11/2001 | Cooper et al. | |
| 6,436,359 B1 * | 8/2002 | Spencer, III | B01D 53/56 |
| | | | 423/235 |
| 6,506,350 B2 | 1/2003 | Cooper et al. | |
| 6,511,644 B1 | 1/2003 | MacArthur et al. | |
| 6,730,280 B2 | 5/2004 | Cooper et al. | |
| 6,761,868 B2 * | 7/2004 | Brooks | B01D 53/79 |
| | | | 423/235 |
| 6,887,449 B2 * | 5/2005 | Brooks | C01C 1/08 |
| | | | 423/358 |
| 7,008,603 B2 | 3/2006 | Brooks et al. | |
| 7,220,395 B2 | 5/2007 | Cooper et al. | |
| 7,695,695 B2 | 4/2010 | Shin et al. | |
| 8,197,760 B2 * | 6/2012 | Akai | B01J 19/24 |
| | | | 165/65 |
| 8,313,722 B2 * | 11/2012 | Spencer, III | C01C 1/086 |
| | | | 423/235 |
| 8,673,231 B2 * | 3/2014 | Giroudiere | B01J 8/062 |
| | | | 422/198 |
| 8,875,499 B2 * | 11/2014 | Kawada | F01N 3/2066 |
| | | | 60/286 |
| 2003/0118494 A1 * | 6/2003 | Glesmann | B01D 53/56 |
| | | | 423/235 |
| 2004/0208813 A1 | 10/2004 | Brooks et al. | |
| 2007/0217991 A1 * | 9/2007 | Mori | B01J 8/067 |
| | | | 423/462 |
| 2007/0235171 A1 | 10/2007 | Romiti | |
| 2009/0120079 A1 * | 5/2009 | Buckberry | B01D 53/56 |
| | | | 60/303 |
| 2009/0148370 A1 * | 6/2009 | Spencer, III | C01C 1/086 |
| | | | 423/235 |
| 2011/0033360 A1 * | 2/2011 | Shishido | B01D 53/90 |
| | | | 423/239.1 |
| 2014/0127100 A1 | 5/2014 | Gerhart et al. | |

FOREIGN PATENT DOCUMENTS

| | | |
|---|---|---|
| DE | 202 537 A | 9/1983 |
| EP | 0 487 886 A | 6/1992 |
| JP | HEI2-191528 KK | 7/1990 |
| JP | 02 268811 A | 11/1990 |
| JP | 6165913 | 6/1994 |
| JP | 08-057258 | 3/1996 |
| JP | 08-071372 | 3/1996 |
| JP | 08-281074 | 10/1996 |
| JP | 9173786 | 7/1997 |
| WO | 94/13391 | 6/1994 |
| WO | 98/51402 A | 11/1998 |

OTHER PUBLICATIONS

Mori, et al, "Operating Experience of SCR Systems at EPDC Coal Fired Power Stations", Proceedings of Session 6A of the Joint Symposium on Stationary Combustion NOx Control, United States Environmental Protection Agency and The Electric Power Research Institute, Mar. 6-9, 1989, San Francisco, California.

Kempe's Engineering Year-Book, 1991, 96th Ed., vol. 2, Morgan-Grampian Book Publishing Co. Ltd., London, England, Steam Table F10/5.

"Ammonia From Urea", SIIRTEC NIGI S.p.A, 2001, Milan, Italy.

Lagana, et al, "Power Generation Environmental Issues & Nitrogen Industry: a cross-linked and effective industrial know-how osmosis", Nitrogen 2001 Conference, Feb. 18-21, 2001, Tampa, Florida.

Glesmann, et al, "Design and Operation of a Safe Alternative to Anhydrous Ammonia: Urea-Based Ammonia-on-Demand (AOD) at AEP's Gavin Station", U.S. EPA-DOE-EPRI Combined Power Plant Air Pollution Control Symposium, Aug. 20-23, 2001, Chicago, Illinois.

Sugiyama, "Phase Diagram", (2002), visited on Dec. 17, 2009 at gfd-dennou.org/library/oboro/gallery/output/phase/index.html.en.

Walker, et al, "Ammonia-on-Demand—Mature and Reliable Technology", Doe Conference on Selective Catalytic Reduction and Non-Catalytic Reduction for NOx Control, Oct. 2003, Pittsburgh, Pennsylvania.

Walker, et al, "Ammonia-on-Demand Installations at American Electric Power's Clifty Creek and Kyger Creek Plants Provide 100% Availability and Safe Operation", 2003 Conference on Selective Catalytic Reduction and Non-Catalytic Reduction for NOx Control, The National Energy Technology Laboratory, U.S. Department of Energy, Oct. 29-30, 2003, netl.doe.gov/publications/proceedings/03/scr-sncr/scr-sncr03.html.

"Revamping Urea", brochure published by SIIRTEC NIGI S.p.A., Milan, Italy, available to the public 2005.

Miccuci, "Ammogen—A Technology for Generating Ammonia From Urea in DeNOx Plants", SIIRTEC NIGI, S.p.A., Sep. 2005, Milan, Italy.

"Pressure and Boiling Points of Water", The Engineering Toolbox, (2005), visited on Dec. 17, 2009 at engineeringtoolbox.com/boiling-point-wanter-d_926.html.

SIIRTEC NIGI, S.p.A., website pages, Oct. 10, 2006, Milan, Italy.

Spencer, et al, "Design Considerations for Generating Ammonia from Urea for NOx Control with SCRs", Proceedings of the A&WMA 100th Conference, Pittsburg, Pennsylvania, Jun. 26-29, 2007, OCLC: 227005416, ISBN: 9780923204952; 0923204954, Report No. ACE-07-CD.

* cited by examiner

UREA TO AMMONIA PROCESS

BACKGROUND OF THE INVENTION

1. Field of Invention

Ammonia is a highly toxic gas that is usually stored under high pressure as a liquid. It presents substantial hazards in transportation, storage and handling. Ammonia is used in many industrial processes and as a reducing agent in selective catalytic reduction of nitrous oxide in many combustion processes. The Urea to Ammonia technology offers a safe means of producing ammonia on demand from urea, which is a safe non-toxic substance, to be utilized in processes, particularly selective catalytic reduction (SCR), in which a non-pure ammonia source can be utilized.

2. Brief Description of Related Technology

This invention relates to processes and systems for the removal of nitrogen oxides from combustion gas streams and for other industrial uses based on the hydrolysis of urea to ammonia.

One method for providing a pressurized gas stream for removing nitrogen oxides from a combustion gas stream by SNCR (Selective Non-Catalytic Reduction) or SCR (Selective Catalytic Reduction) processes includes feeding an aqueous solution of urea or mixtures of urea-containing biuret and/or ammonium carbamate into a reactor and hydrolyzing the urea therein at temperatures of at least 110° C. and under pressure, Cooper, et. al. U.S. Pat. No. 6,077,91, the disclosure of which is expressly incorporated herein by reference. The reaction rate is controlled by the input of heat to the reactor to produce a gaseous product stream containing ammonia and feeding it into a combustion gas stream at a controlled rate which is approximately the amount necessary to the demand for external use in removing nitrogen oxides. The rate of hydrolysis of urea must be balanced with the demand for ammonia to achieve thorough removal of nitrogen oxides while avoiding ammonia slip. In the prior art, this balance has been based on manipulation of the reactor pressure and heat input to the hydrolysis reactor in response to demand.

In the prior methods, typically there is a demand signal emitted by a detection system within the effluent combustion gas stream which is linked to the heat source and/or pressure controller at the hydrolysis reactor intended to maintain the ammonia-gas generation rate at a level equal to that required to scrub the nitrous oxides from the combustion gas. The urea solution level within the reactor is kept essentially constant by a fluid level detector governing the pumping rate of urea solution to the hydrolysis reactor. The solution level of the urea solution in the reactor is independent of the ammonia-gas requirement in the combustion gas stream. Since water is both a reactant in urea hydrolysis as well as being lost as steam in the ammonia going to the combustion gas stream, the effect of the feed rate of urea solution to the reactor being independent of ammonia demand while the urea solution level in the hydrolysis reactor remains essentially constant is that the concentration of water in the urea solution in the reactor varies. Variation in the water concentration causes fluctuation in the ammonia generation rate.

According to the present invention, the volume of aqueous urea-containing solution in the hydrolyzer varies. More particularly, the urea concentration in the aqueous solution in the hydrolyzer and the temperature are kept more nearly constant by the matching of the aqueous urea-containing solution feed rate to the hydrolyzer with the demand for ammonia-gas for scrubbing $NO_X$, flue gas conditioning or other industrial purposes.

This invention is particularly useful for scrubbing $NO_X$ from combustion gas streams, in flue gas conditioning and other industrial uses which require relatively low rates of ammonia-containing product gas on the order of about 0.1 to about 100 pounds of ammonia per hour.

SUMMARY OF THE INVENTION

A method adapted to provide a pressurized ammonia-containing gas stream from aqueous urea, the method comprising feeding an aqueous urea-containing solution to a fluid-tight enclosure at a rate to match the external demand rate for ammonia-gas, wherein a fluid heat transfer medium is present on the exterior of said fluid-tight enclosure to transfer heat to the aqueous urea-containing solution within the enclosure to hydrolyze the solution and convert the urea-containing solution to an ammonia gaseous product comprising ammonia, carbon dioxide and water vapor, the pressure within said fluid-tight enclosure being maintained by back pressure control to ensure that the ratio of urea and water is maintained independent of the ammonia generation rate, and the urea is converted.

One preferred method is adapted to provide a pressurized ammonia-containing gas stream from aqueous urea, the method comprising feeding an aqueous urea-containing solution to the tube side of a shell and tube heat exchanger at a rate to match the external demand rate for ammonia-gas, wherein a fluid heat transfer medium is present on the shell side to transfer heat to the aqueous urea-containing solution within the tubes sufficient to hydrolyze the solution and convert the urea-containing solution to an ammonia gaseous product comprising ammonia, carbon dioxide and water vapor, the pressure on the tube side being maintained by back pressure control to ensure that the ratio of urea and water is maintained independent of the ammonia generation rate, and the urea is converted.

Alternatively, a method adapted to provide a pressurized ammonia-containing gas stream from aqueous urea, the method comprising feeding an aqueous urea-containing solution to a coil within a shell at a rate to match the external demand rate for ammonia-gas, wherein a fluid heat transfer medium is present within said shell on the coil exterior to transfer heat to the aqueous urea-containing solution within the coil sufficient to hydrolyze the solution and convert the urea-containing solution to an ammonia gaseous product comprising ammonia, carbon dioxide and water vapor, the pressure in the coil interior being maintained by back pressure control to ensure that the ratio of urea and water is maintained independent of the ammonia generation rate, and the urea is converted.

Superheated inert gas at essentially constant temperature can be introduced into the evolved ammonia-containing product gas.

A preferred method of the invention for producing a pressurized gaseous ammonia-containing product, useful for the catalytic reduction of nitrous oxides or flue gas conditioning, from an aqueous urea-containing solution, the method comprising feeding an aqueous urea-containing solution to a shell and tube heat exchanger in response to an external demand signal at a rate balanced to meet the external demand for gaseous ammonia, where the aqueous urea-containing solution flows through the tubes at essentially constant temperature and pressure, and is heated by hot fluid medium present on the shell side of the heat exchanger, admixing a hot carrier gas or steam with the evolved ammonia-containing product gas exiting the reactor to prevent condensation of the ammonia-containing product gas downstream and provide improved mixing at the point of use, said aqueous urea solution in said tubes being maintained under pressure utilizing a back pressure control valve to convert the urea to a gaseous ammonia-containing product.

Another preferred method of the invention for producing a pressurized gaseous ammonia-containing product, useful for the catalytic reduction of nitrous oxides or in flue gas conditioning, from a solution of aqueous urea-containing solution, the method comprising feeding an aqueous urea-containing solution to a shell and tube heat exchanger in response to an external demand signal at a rate balanced to meet the external demand for gaseous ammonia, where the aqueous urea solution flows through the tubes at essentially constant temperature and pressure, and is heated by hot fluid medium present on the shell side of the heat exchanger, said heat exchanger containing a second tube bundle, pumping air or carrier gas through said second tube bundle to generate hot air or carrier gas, admixing said hot air or carrier gas or steam with the evolved ammonia-containing product gas exiting the first tubes to prevent condensation of the ammonia-containing product gas downstream and provide improved mixing at the point of use, said aqueous urea solution in said first tubes being maintained under pressure utilizing a back pressure control valve to convert the urea to a gaseous ammonia-containing product.

Yet another preferred method of the invention for producing a pressurized gaseous ammonia-containing product, useful for the catalytic reduction of nitrous oxides or in flue gas conditioning, from an aqueous urea-containing solution, the method comprising feeding an aqueous urea-containing solution to a coil within a shell in response to an external demand signal at a rate balanced to meet the external demand for ammonia, where the aqueous urea-containing solution flows through said coil at essentially constant temperature and pressure, and is heated by hot fluid medium present in the shell in heat transfer contact with the external surface of said coil, admixing a hot air carrier, gas or steam with the evolved ammonia-containing product gas exiting the coil to prevent condensation of the ammonia-containing product gas downstream and provide improved mixing at the point of use, said aqueous urea solution being maintained under pressure utilizing a back pressure control valve to convert the urea to a gaseous ammonia-containing product.

The invention includes systems for the production of gaseous ammonia-containing product to meet an external demand comprising a source of aqueous urea-containing solution, a fluid-tight enclosure, means for providing fluid heat transfer media in contact with the exterior surfaces of said fluid-tight enclosure, means for continuously introducing aqueous urea-containing solution from said source into the enclosure to provide for the evolution of gaseous ammonia, means for controlling said means for continuously introducing aqueous urea-containing solution to balance the rate of introduction of said urea-containing aqueous solution into said fluid-tight enclosure with said external demand for ammonia and means for maintaining essentially constant pressure within said fluid-tight enclosure.

In another aspect, the invention further includes systems for the production of gaseous ammonia-containing product to meet an external demand comprising a source of aqueous urea-containing solution, a shell and tube heat exchanger having a tube bundle within the outer shell, means for providing fluid heat transfer media within said shell and in contact with the exterior surfaces of said tube bundle, means for continuously introducing aqueous urea-containing solution from said source into the tube bundle to provide for the evolution of gaseous ammonia, means for controlling said means for continuously introducing aqueous urea-containing solution to balance the rate of introduction of said urea-containing aqueous solution into said tube bundle with said external demand for ammonia and means for maintaining essentially constant pressure within said tube bundle.

The invention also comprises a system for the production of gaseous ammonia-containing product to meet an external demand comprising a source of aqueous urea-containing solution, a shell having a coil within the shell, means for providing fluid heat transfer media within said shell and in contact with the exterior surfaces of said coil, means for continuously introducing aqueous urea-containing solution from said source into the coil to provide for the evolution of gaseous ammonia, means for controlling said means for continuously introducing aqueous urea-containing solution to balance the rate of introduction of said urea-containing aqueous solution into said coil with said external demand for ammonia and means for maintaining essentially constant pressure within said coil.

The systems as just described can further comprise means for providing superheat to the gas as it is generated within said fluid-tight enclosure, tube bundle or coil, means within said fluid-tight enclosure, shell or coil for heating said heat transfer media, means within said shell or coil for blowing air in closed heat transfer relationship with said heat transfer media to continuously generate hot air or steam, and means for diluting the ammonia-containing product gas with said generated hot air or steam.

The heat exchanger tubes or coil volume on both the tube or coil side and the shell side is sized to ensure that all urea solution will fully convert to the gaseous product at up to the maximum urea feed rate without the necessity of controlling the liquid level within the tubes or coil.

The fluid-tight enclosure such as a tube bundle or coil may be enclosed in a shell as indicated in the drawings. The fluid-tight enclosure may also be incorporated in a duct or conduit through which hot combustion gases continuously pass when the system is in operation. For example, the fluid-tight enclosure can be incorporated in an external duct carrying the hot combustion gas stream from a gas turbine used to power an electric generator.

The evolved product ammonia-containing gas mixture is preferably superheated within the upper portion of the interior of the heat exchange tubes or coil by a hot gas or fluid medium. This reduces the formation of water condensation in the downstream piping reducing possibility of forming condensed material pluggage and corrosion.

The present invention has the advantage over other urea to ammonia processes in that it is a simpler, more responsive to demand change, less expensive and more compact process that is particularly well suited to smaller installations.

Many variations are effective. For example, the fluid heat transfer medium can be heated by a heating coil within the shell or by a separate external heater. The preferred fluid heat transfer medium on the shell side is hot oil, steam or hot air where the tube bundle or coil is incorporated in an exhaust duct, the fluid heat transfer medium is a hot combustion gas stream which is continuously passed over the tube bundle or coil.

The empty hydrolysis system can be preheated prior to aqueous urea-containing solution introduction to enable faster start up time and/or the aqueous urea-containing solution can be preheated prior to introduction into the hydrolysis tube bundle or coil to enable faster response rates or reduction in size of the tube bundle or coil.

Hot air can be withdrawn from the carrier gas tube bundle or coil before it is mixed with the product ammonia-containing gas and recycled to a heater to reduce the energy requirement.

Cold air can be introduced to the shell side of the hydrolysis tube bundle or exterior of the coil to remove heat, reduce the pressure and enable a fast shutdown.

A surge tank can be connected to the interior of the tube bundle or coil, and sized to maintain a pressurized inventory of hot liquid urea solution or provide a product gas inventory in the gas space of the surge tank to enable more rapid changes in the product gas production rate for response to changes in ammonia demand.

An aqueous urea-containing solution reservoir can also be provided at the bottom of the tube bundle which contains an inventory of urea solution and a separate heater coil to increase the capability of the system to quickly increase the production rate of ammonia-containing product gas.

Quick fill valve and blow back valve provide a means to quickly establish required liquid level in the tube/coil reactor to meet fast demand changes.

BRIEF DESCRIPTION OF THE DRAWINGS

Turning to the drawings.

Figure 1:
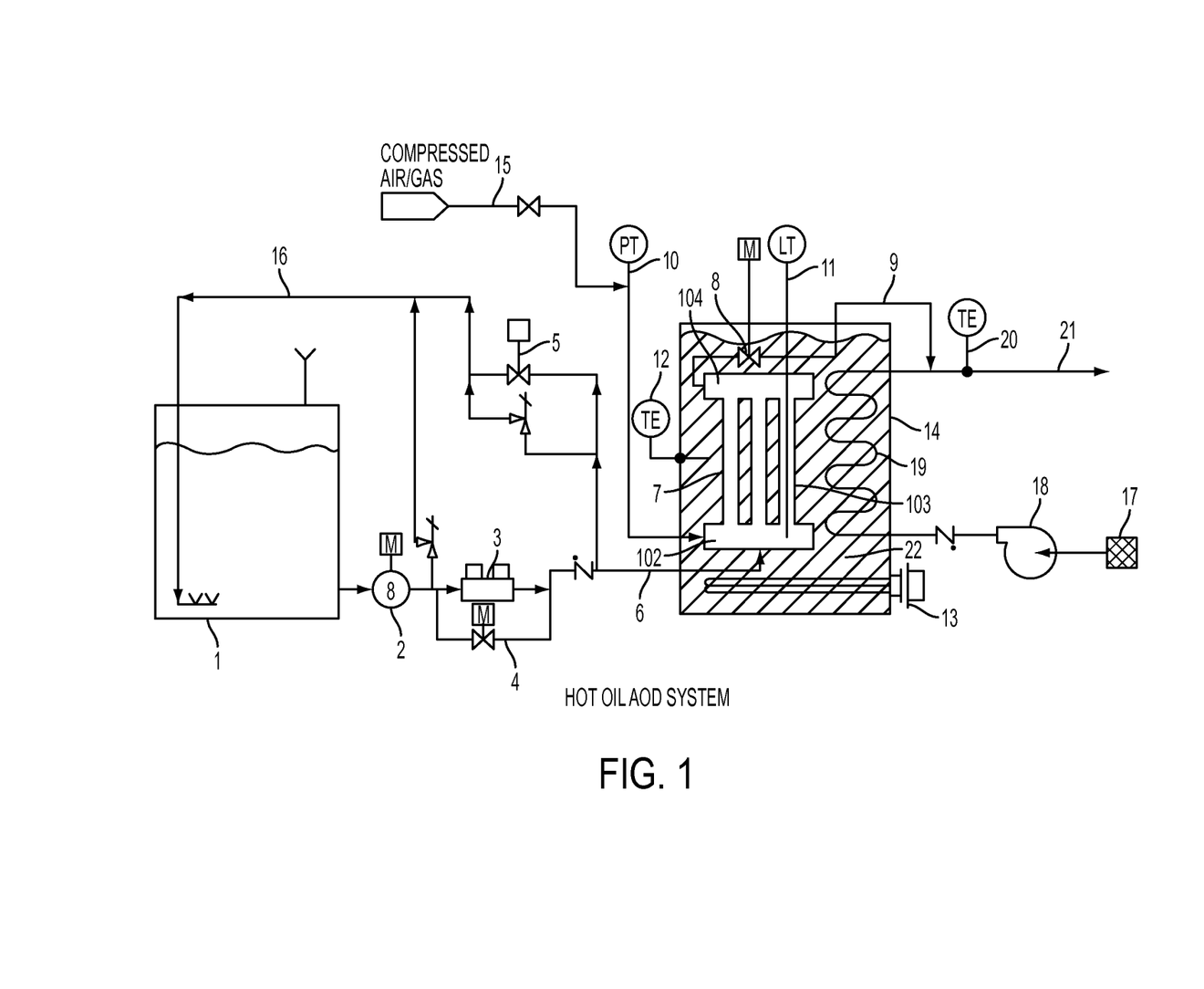
FIG. 1 is a schematic drawing of a preferred embodiment of the method and system of the invention.

Turning to the drawings in more detail, the aqueous urea solution storage/quench tank 1 and feed pump 2 supply the aqueous urea solution for hydrolysis. The feed rate of urea solution is governed by urea feed rate controller 3 which is electrically connected to a gas analyzer positioned downstream at the point of ammonia demand. Commonly, the gas analyzer is located in the effluent combustion gas stream of a fossil fueled power plant using ammonia to scrub $NO_X$ and serves to balance the ammonia gas stream with the demand presented by the $NO_X$ in the combustion gas stream to maintain adequate scrubbing without slip.

The urea feed line 6 also serves as a blow back line and feeds the aqueous urea-containing solution into the hydrolysis heat exchanger tube bundle assembly 7. Blow back valve 5 regulates reactor liquid blow back via line 16. The urea feed line 6 can be provided with a quick fill valve 4.

The blow back valve 5 and quick fill valve 4 serve to quickly change the reacting fluid inventory in the reactor to shorten the time required to adjust the ammonia generation rate.

The reactor 7 is equipped with a back pressure control valve 8.

The ammonia-gas generated in heat exchanger assembly 7 is discharged to a combustion gas stream to be scrubbed of $NO_X$, flue gas conditioning, or for other chemical uses, via discharge line 9. The ammonia in line 9 may be diluted by air from dilution air heat exchange coil 19. The diluted gas stream is discharged via line 24. Dilution air is forced through coil 19 by dilution air blower 18 which is normally provided with an inlet air filter 17.

The heat exchanger assembly 7 has a pressure transmitter 10 and a fluid level transmitter 11.

In this preferred embodiment, heat to the heat exchanger assembly 7 is provided by heat transfer oil 22 in the shell surrounding the tube bundle of heat exchanger assembly 7 which serves as a hot oil reservoir 14. The heat transfer oil 22 is maintained by hot oil heater 13 which is equipped with hot oil temperature sensor 12.

Pressurized air may be provided to the heat exchanger tube bundle or coil for purging upon shut down or to enable pre-pressurization of tube or coil reactor for more rapid initial ammonia generation via line 15. A dilution air temperature transmitter 20 is provided in line 21.

Figure 2:
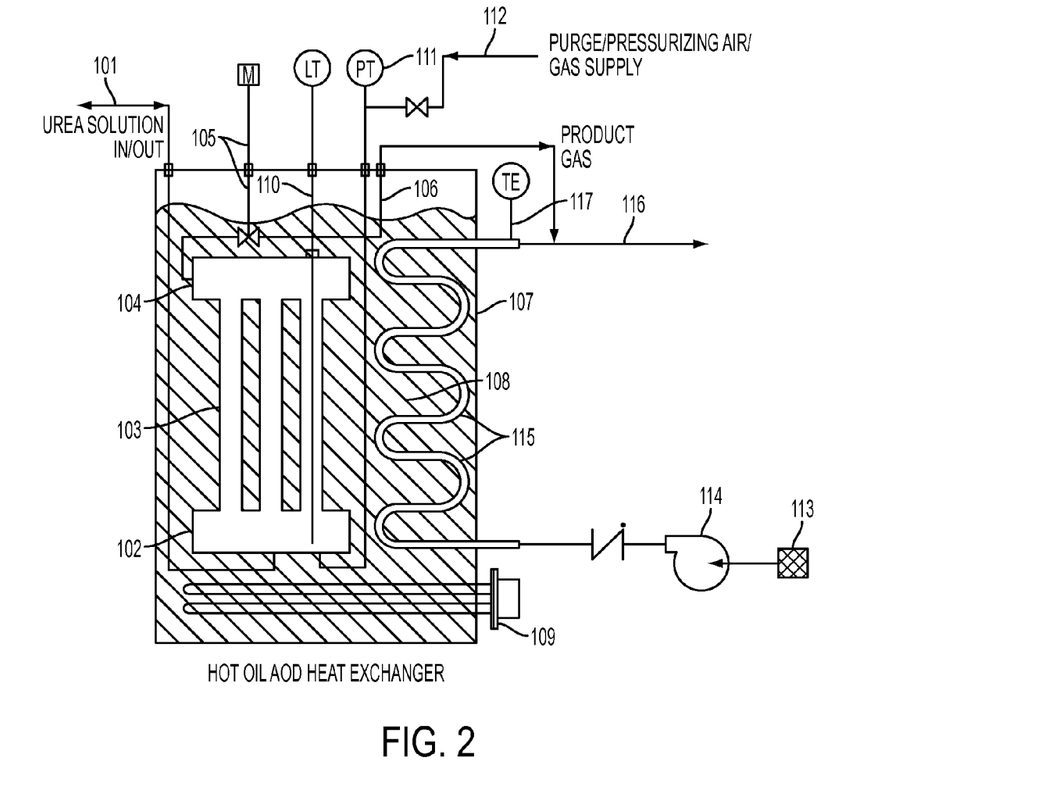
FIG. 2 is a schematic drawing of slightly modified embodiment of shell and tube components used in the present invention.

FIG. 2 depicts in more detail the hot oil hydrolyzer system with dilution air heater. The aqueous urea solution is supplied via line 101 which also serves as a blow back line. The tubes 103 communicate with aqueous urea inlet plenum 102 and ammonia-containing gas outlet plenum 104.

The hot oil reservoir 107 contains hot heat transfer oil 108 heated by hot oil heater 109. The dilution air heat exchange coil 115 is also heated by heat transfer oil 108. The dilution air is blown through coil 115 by dilution air blower 114 which is equipped with an inlet filter 113. The temperature of the dilution air at the outlet of coil 115 has a dilution air temperature transmitter 117.

The liquid level at the outlet plenum 104 of the heat exchanger assembly is indicated by reactor level transmitter 110 and the pressure by reactor pressure transmitter 111.

Air or other inert gas supply to the inlet 102 plenum and tubes 103 to pressurize, or at shutdown, to purge is supplied via air or gas line 112.

The back pressure in the inlet plenum 102 and tubes 103 is controlled by valve 105. The ammonia-gas generated in tubes 103 is discharged at line 106 and this gas is diluted with air at dilution product gas discharge line 116.

Figure 3:
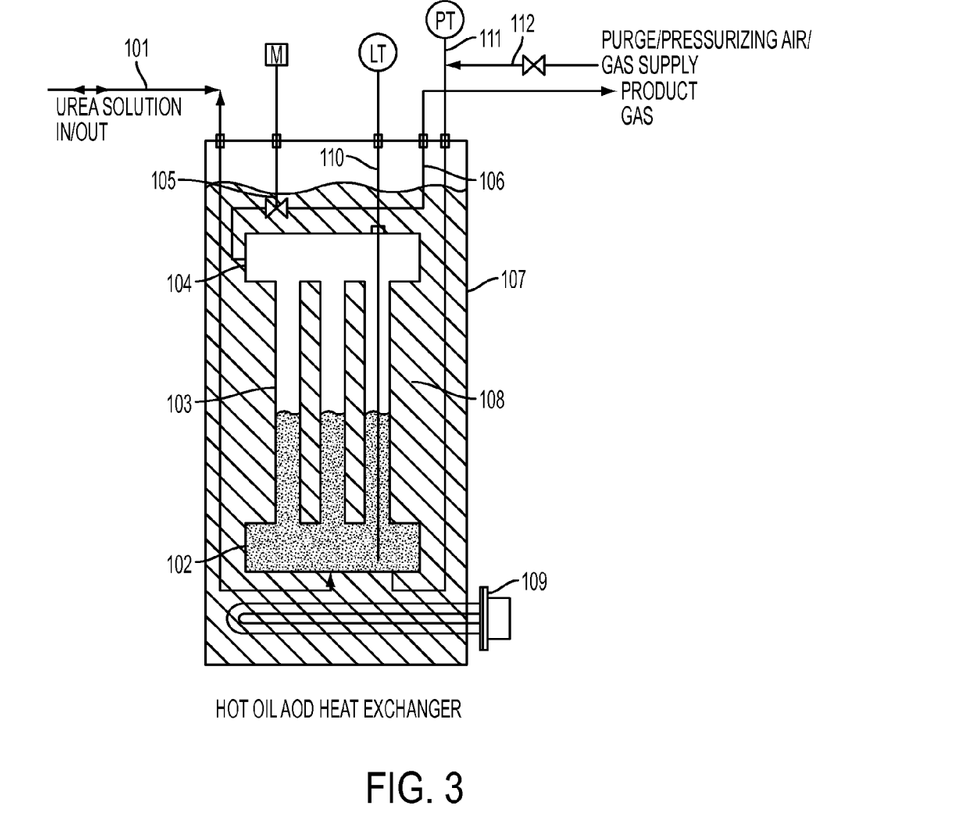
FIG. 3 is a schematic drawing of another embodiment of the shell and tube components used in this invention.

The embodiment of FIG. 3 is similar to that of FIG. 2 except that the dilution of the ammonia-containing product gas is eliminated along with the requirement for a dilution air heat exchange coil.

Figure 4:
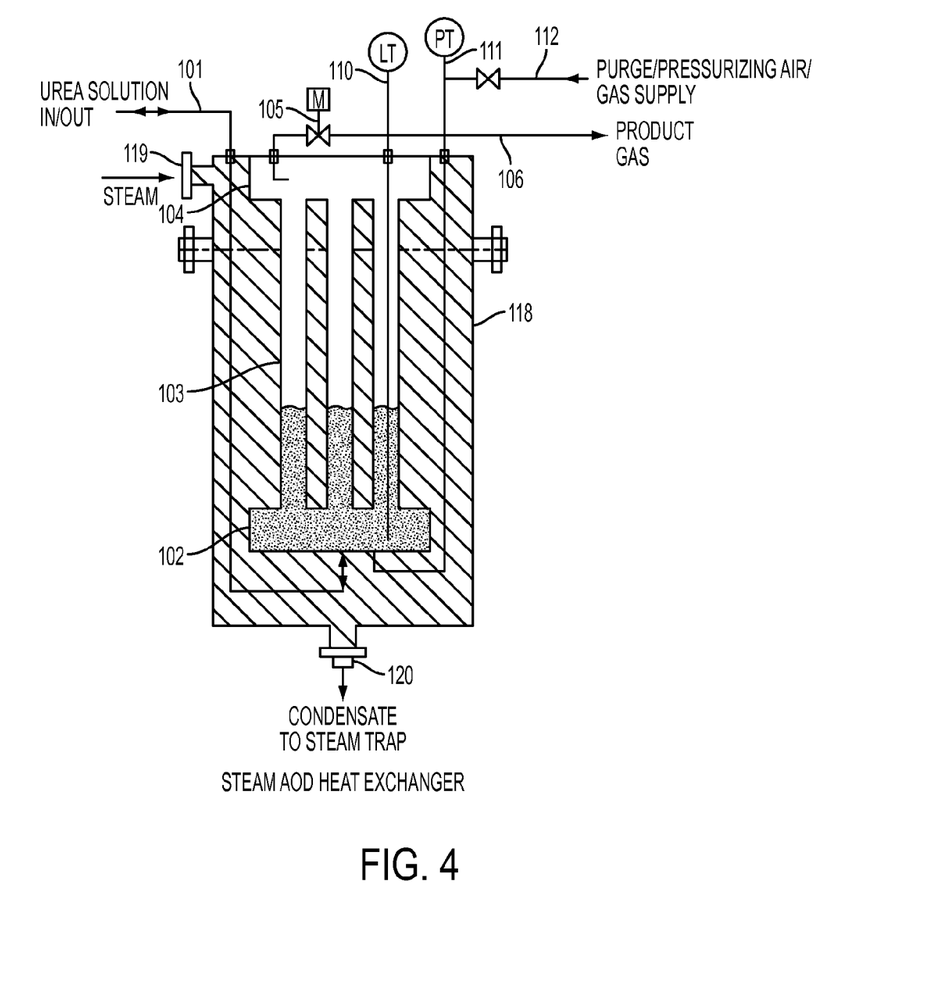
FIG. 4 is another embodiment of the shell and tube components wherein steam is used as the fluid heat transfer medium.

In the alternate embodiment of FIG. 4, the hot oil reservoir 107 and hot heat transfer oil 108 are replaced by steam vessel shell 118 fitted with steam inlet nozzle 119 and condensate discharge nozzle 120. In this embodiment, steam around tubes 103 provides the heat required for the hydrolysis reaction of the aqueous urea solution within tubes 103.

Figure 5:
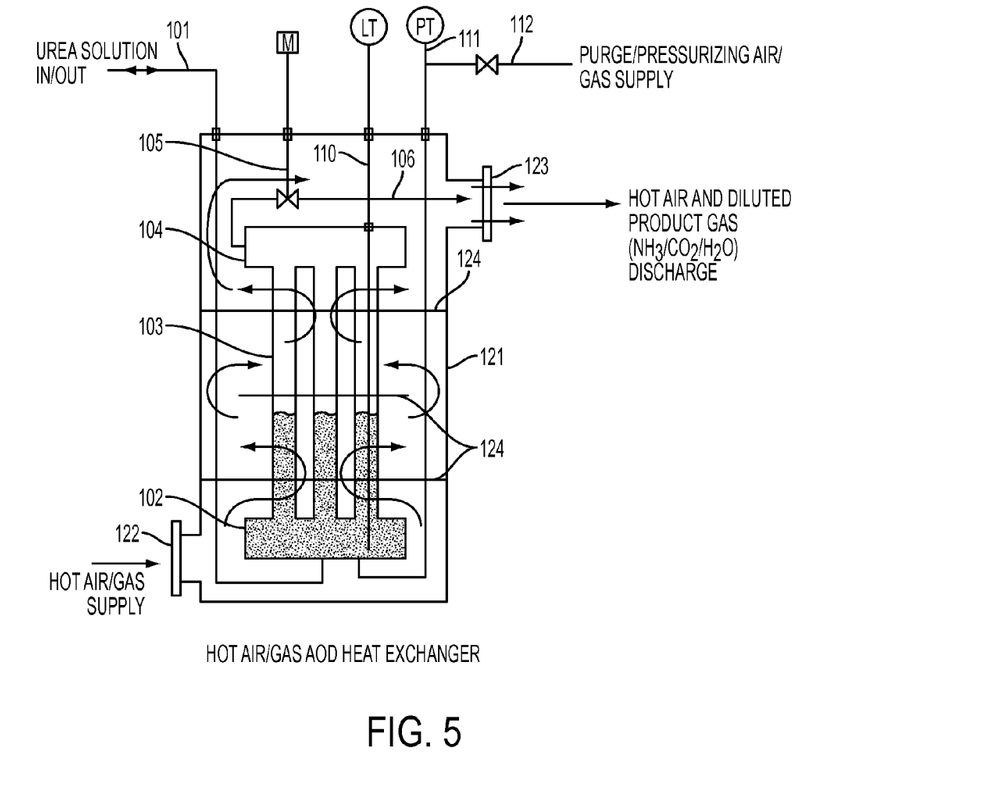
FIG. 5 is still another embodiment of the shell and tube components wherein hot air is used as the fluid heat transfer medium.

Turning to another alternate embodiment, FIG. 5 employs hot air or other hot gas as the heat transfer medium in place of hot oil or steam. The hot air shell or duct 121 has a hot air inlet nozzle 122 and a hot air outlet nozzle 123. The hot air at this point can be used to dilute the ammonia-containing gas coming from outlet plenum 104. To enhance hot air circulation in the shell or duct 121 around tubes 103, a series of baffles 124 can be provided.

DETAILED DESCRIPTION OF THE INVENTION

The storage tank 1 located near the heat exchanger is adapted to serve as surge tank and possible a day tank containing sufficient aqueous urea-containing solution for one day. A preheater is not required since the feed line 6 submersed in the hot medium 22 supplying urea solution to the inlet plenum 102 can act as a preheater.

The vertical tube bundle 103 is always partially filled and the reacting liquid temperature is few degrees lower than the heat media 22 due to heat required to sustain reaction and water evaporation. The upper portion 104 of tube bundle 103 which will be filled with product gas is available to heat the product gas up to heat media temperature as a small superheat.

It is to be understood that the tube bundle 103 can be replaced by a coil submerged in fluid heat transfer media. The hydrolysis of urea takes place within the tube or coil.

The aqueous urea-containing solution may also contain biuret or ammonium carbamate.

The generated ammonia-gas is essentially free of urea, biuret and ammonium carbamate.

The adequacy of heat is provided by heat stored in the hot oil, steam or hot air/gas.

It is necessary to establish pressure in the hydrolysis tubes or coil. This is provided by a means of pre-pressurizing the tubes or coil prior to initial start and maintaining minimum pressure during the idled mode.

In addition to above, to quickly establish the volume of urea-containing solution in the tubes or coil required to sustain the reaction rate (ammonia generation rate), a liquid level transmitter 11 and quick fill valve 4 are used which by passes the urea feed flow controller 3. For major load (ammonia demand) change the quick fill valve 4 and blow-back valve 5 will quickly control the reacting liquid level in the tube bundle 103. In essence the capacity is controlled by varying the liquid volume in the tube bundle 103 while keeping the temperature and pressure constant. It is possible to operate in this way because the volume and ammonia design capacity of the method is fairly low (on the order of about 0.1 to 100 pounds per hour).

A dilution air heater coil 19 can be added to generate hot dilution air from the same heat source (hot oil, hot air, steam or combustion exhaust gas) used to support the hydrolysis reaction.

Prior art urea to ammonia hydrolysis technologies pump the urea solution into a hydrolysis reactor vessel where steam or electric heater coils submerged in the aqueous urea-containing reaction medium are controlled to heat the fluid to maintain a set pressure range or set temperature range or both predetermined temperature and pressure ranges within the vessel. Changes within these ranges occur in response to the demand for ammonia. The urea flow rate to the reactor vessel is controlled to maintain a relatively constant liquid level within the reactor regardless of ammonia demand utilizing level measuring instrumentation. The processes retain a liquid phase reaction medium in the reactor for further conversion to gaseous ammonia. Since the heat is provided within the liquid side of the reactor in the prior art method, the gases exiting the reactor are essentially saturated at all production rates which increases the risk of the formation of unwanted condensate downstream, requiring heat tracing.

According to the present invention the aqueous urea-containing solution feed rate into the hydrolysis tube/coils is controlled to produce the required ammonia-gas for the process. The heat input into the process occurs at the essentially constant temperature of the hot oil, steam or hot air with heat input being a function of the level of solution in the tube bundle or coil. As the ammonia production rate increases in response to increased demand the fluid level in the tubes or coil increases until there is a balance between the heat transfer to react the amount of urea to meet the ammonia production demand requirement and to evaporate the water in the feed solution. Urea solution level control is obtained through the balance of the heat input with the feed solution. As the fluid level increases there is more heat transfer across the hydrolysis tube bundle or coil. The tube bundle or coil volume, heat transfer area and heat input are sized to ensure that all urea solution will be fully reacted to a gaseous product up to the maximum urea feed rate, within the bundle or coil volume.

The tube bundle or the coil containing the urea solution is essentially submerged in hot oil or essentially surrounded by hot air, steam or combustion exhaust gases. There is no heating element within the tube bundle or coil containing the aqueous urea solution. A constant reaction temperature enables setting a corresponding constant reaction pressure for a given aqueous urea feed solution concentration independent of the ammonia generation (urea solution feed) rate thus allowing reaction water balance to be independent of the ammonia generation (urea solution feed) rate. The essentially constant temperature of hydrolysis is at least 110° C., and normally from about 130° C. to about 200° C., and the essentially constant pressure is from about 25 psig to about 170 psig. The aqueous urea-containing feed solution concentration is from about 1% to 76% by weight urea, and more typically from about 25% to 50% urea by weight.

The gases exiting the tube bundle or coil will be heated above the saturation temperature and will contain some superheat, which reduces the potential for the ammonia to recombine with the carbon dioxide to make an ammonium carbamate solid and plug the line. Additionally combining a hot carrier medium with the product gas at the exit of the tube side or coil interior further reduces the gas dew point and in many cases can eliminate the need to heat trace the product gas line to the process.

Another embodiment of the invention utilizes a heat transfer fluid which is heated by an electric heater to constant temperature with urea tube bundle or coil submersed within the thus heated heat transfer fluid. In cases where either steam or hot air are not available a separate heat exchanger is also submerged in the same hot fluid medium as the urea to ammonia hydrolyzer tube bundle or coil to heat air provided by an external source. This hot air steam is then mixed with the ammonia product gas exiting the hydrolysis tube bundle or coil to lower the gas dewpoint temperature.

What is claimed is:

1. A method adapted to provide a pressurized ammonia-containing gas stream from aqueous urea, the method comprising feeding an aqueous urea-containing solution to a fluid-tight enclosure at a rate to match the external demand rate for ammonia-gas, wherein a fluid heat transfer medium is present on the exterior of said fluid-tight enclosure to transfer heat to the aqueous urea-containing solution within the enclosure to hydrolyze the solution and convert the urea-containing solution to an ammonia gaseous product comprising ammonia, carbon dioxide and water vapor, the pressure within said fluid-tight enclosure being maintained by back pressure control to ensure that the ratio of urea and water is maintained independent of the ammonia generation rate, and the urea is converted.

2. A method of scrubbing nitrogen oxides from combustion gas streams comprising feeding an aqueous urea-containing solution to a fluid-tight enclosure at a rate to match the external demand rate for ammonia-gas as demand changes, wherein a fluid heat transfer medium is present on the exterior of said fluid-tight enclosure, said fluid-tight enclosure being essentially submerged in said fluid heat transfer medium, to transfer heat to the aqueous urea-containing solution within the enclosure to hydrolyze the solution and convert the urea-containing solution to an ammonia gaseous product comprising ammonia, carbon dioxide and water vapor, the temperature within said fluid-tight enclosure being maintained essentially constant, the pressure within said fluid-tight enclosure being maintained by back pressure control to ensure that the ratio of urea and water is maintained essentially constant and independent of the ammonia generation rate, and the urea is converted, and said ammonia gaseous product being heated within said enclosure to above the saturation temperature and then contacting said ammonia gaseous product with said combustion gas stream at a rate sufficient to scrub nitrogen oxides from said combustion gas stream.

3. The method of claim 1 or 2 wherein the fluid-tight enclosure is a tube bundle or coil.

4. A method adapted to provide a pressurized ammonia-containing gas stream from aqueous urea, the method comprising feeding an aqueous urea-containing solution to the tube side of a shell and tube heat exchanger at a rate to match the external demand rate for ammonia-gas, wherein a fluid heat transfer medium is present on the shell side to transfer heat to the aqueous urea-containing solution within the tubes sufficient to hydrolyze the solution and convert the urea-containing solution to an ammonia gaseous product comprising ammonia, carbon dioxide and water vapor, the pressure on the tube side being maintained by back pressure control to ensure that the ratio of urea and water is maintained independent of the ammonia generation rate, and the urea is converted.

5. A method adapted to provide a pressurized ammonia-containing gas stream from aqueous urea, the method comprising feeding an aqueous urea-containing solution to a coil within a shell at a rate to match the external demand rate for ammonia-gas, wherein a fluid heat transfer medium is present within said shell on the coil exterior to transfer heat to the aqueous urea-containing solution within the coil sufficient to hydrolyze the solution and convert the urea-containing solution to an ammonia gaseous product comprising ammonia, carbon dioxide and water vapor, the pressure in the coil interior being maintained by back pressure control to ensure that the ratio of urea and water is maintained independent of the ammonia generation rate, and the urea is converted.

6. The method of claim 4 or 5 wherein superheated inert gas at essentially constant temperature is admixed into the evolved ammonia-containing product gas.

7. The method of claim 4 wherein the aqueous urea solution level within the tube side follows the demand for ammonia and the heat input to the reactor follows the aqueous urea solution level.

8. The method of claim 3, 4 or 5 wherein the temperature of the aqueous urea solution in said tubes or coil is held essentially constant.

9. The method of claim 3, 4 or 5 wherein the pressure within said tubes or coil is held essentially constant.

10. The method of claim 4 or 5 where the aqueous urea solution is a mixture of urea and ammonium carbamate or a solution of biuret or other aqueous urea-containing solutions.

11. The method of claim 4 wherein the hot air or other heated carrier gas or steam is admixed within the tube side with the ammonia-containing product gas leaving said tube side.

12. The method of claim 11 wherein a portion of the hot air or other heated carrier gas or steam is withdrawn from said tube side before mixing with the product gas and recycling the withdrawn portion to a heater to reduce the energy requirement.

13. The method of claim 4 or 5 in which the fluid heat transfer medium is hot oil.

14. The method of claim 1 or 2 wherein the fluid-tight enclosure is within an exhaust duct through which hot combustion gases continuously pass.

15. The method of claim 4 or 5 in which the fluid heat transfer medium is heated by a separate heater.

16. The method of claim 4 wherein hot air generated in a separate heat exchanger within said heat exchanger is admixed with the ammonia-gas mixture exiting the tube side of the reactor.

17. The method of claim 4 or 5 wherein the empty tubes or coil are preheated prior to urea solution introduction to enable faster start up time.

18. The method of claim 4 or 5 wherein cold air is introduced into the tubes or coil to remove heat, reduce the pressure and enable a fast shutdown.

19. The method of claim 4 or 5 wherein a surge tank is connected to the interior of said tube bundle or coil and sized to maintain a pressurized inventory of hot liquid solution, product gas inventory in the gas space of the surge tank to enable more rapid changes in the product gas production rate.

20. The method of claim 4 wherein there is a liquid reservoir at the bottom of the tube bundle containing an inventory of urea solution and a separate heater coil to increase the capability of the system to quickly increase the production rate of ammonia-containing product gas.

21. The method for producing a pressurized gaseous ammonia-containing product, useful for the catalytic reduction of nitrous oxides or in flue gas conditioning, from an aqueous urea-containing solution, the method comprising feeding an aqueous urea-containing solution to a shell and tube heat exchanger in response to an external demand signal at a rate balanced to meet the external demand for gaseous ammonia, where the aqueous urea-containing solution flows through the tubes at essentially constant temperature and pressure, and is heated by hot fluid medium present on the shell side of the heat exchanger, admixing a hot carrier gas or steam with the evolved ammonia-containing product gas exiting the reactor to prevent condensation of the ammonia-containing product gas downstream and provide improved mixing at the point of use, said aqueous urea solution in said reactor being maintained under pressure utilizing a back pressure control valve to convert the urea to a gaseous ammonia-containing product.

22. The method for producing a pressurized gaseous ammonia-containing product, useful for the catalytic reduction of nitrous oxides or in flue gas conditioning, from an aqueous urea-containing solution, the method comprising feeding an aqueous urea-containing solution to a shell and tube heat exchanger in response to an external demand signal at a rate balanced to meet the external demand for gaseous ammonia, where the aqueous urea solution flows through the tubes at essentially constant temperature and pressure, and is heated by hot fluid medium present on the shell side of the heat exchanger, said heat exchanger containing a second tube bundle, pumping air or carrier gas through said second tube bundle to generate hot air or carrier gas, admixing said hot air or carrier gas or steam with the evolved ammonia-containing product gas exiting the reactor to prevent condensation of the ammonia-containing product gas downstream and provide improved mixing at the point of use, said aqueous urea solution in said tubes being maintained under pressure utilizing a back pressure control valve to convert the urea to a gaseous ammonia-containing product.

23. The method for producing a pressurized gaseous ammonia-containing product, useful for the catalytic reduction of nitrous oxides or in flue gas conditioning, from an aqueous urea-containing solution, the method comprising feeding an aqueous urea-containing solution to a coil within a shell in response to an external demand signal at a rate balanced to meet the external demand for ammonia, where the aqueous urea-containing solution flows through said coil at essentially constant temperature and pressure, and is heated by hot fluid medium present in the reactor vessel in heat transfer contact with the external surface of said coil, admixing a hot carrier gas or steam with the evolved ammonia-containing product gas exiting the coil to prevent condensation of the ammonia-containing product gas downstream and provide improved mixing at the point of use, said aqueous urea solution being maintained under pressure utilizing a back pressure control valve to convert the urea to a gaseous ammonia-containing product.

24. The method of claim 4 or 5 wherein the heat exchanger tubes or coil volume on both the tube or coil side is sized to ensure that all urea solution will fully convert to the gaseous product at up to the maximum urea feed rate without the necessity of controlling the liquid level within the tubes or coil.

25. The method of claim 4 or 5 wherein the evolved product ammonia containing gas mixture is superheated within the upper portion of the interior of the heat exchange tubes or coil by a hot gas or fluid medium.

26. The method of claim 4 or 5 wherein a quick fill valve and blow back valve provide a means to quickly establish required liquid level in the tube/coil reactor to meet demand changes.

27. The method of claim 4 or 5 wherein to quickly establish the volume of urea containing solution in the tubes or coil required to sustain the ammonia generation rate, a liquid level transmitter and quick fill valve are provided which bypass the urea feed controller.

28. The method of claim 4 or 5 wherein pressurized air is provided to the heat exchanger tube bundle or coil for purging upon shutdown or to enable pre-pressurization of tube or coil reactor for more rapid initial ammonia generation.

29. The method of claim 4 or 5 wherein the upper portion of tube bundle or coil is filled with pressurized ammonia-containing product gas which heats the product gas up to heat media temperature as a small superheat.

30. A method adapted to provide a pressurized ammonia-containing gas stream from aqueous urea, the method comprising feeding an aqueous urea-containing solution to a fluid-tight enclosure at a rate to match the external demand rate for ammonia-gas, wherein a fluid heat transfer medium is present on the exterior of said fluid-tight enclosure to transfer heat to the aqueous urea-containing solution within the enclosure to hydrolyze the solution and convert the urea-containing solution to an ammonia gaseous product comprising ammonia, carbon dioxide and water vapor, the pressure within said fluid-tight enclosure being maintained by back pressure control to ensure that the ratio of urea and water is maintained independent of the ammonia generation rate, and the urea is converted, and wherein said aqueous urea-containing solution is preheated prior to introduction into said fluid-tight enclosure to enable faster response rates or reduction in size of said fluid-tight enclosure.

* * * * *